US008745558B1

(12) United States Patent
Garofalo et al.

(10) Patent No.: US 8,745,558 B1
(45) Date of Patent: Jun. 3, 2014

(54) DEPLOYMENT OF TRANSMISSION GATE LOGIC CELLS IN APPLICATION SPECIFIC INTEGRATED CIRCUITS

(71) Applicant: LSI Corporation, San Jose, CA (US)

(72) Inventors: Joseph Garofalo, Palo Alto, CA (US); Barry L. Bartholomew, Allentown, PA (US); Mujiang Luo, Shanghai (CN); You Xin Rao, Shanghai (CN)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/755,869

(22) Filed: Jan. 31, 2013

(51) Int. Cl.
*G06F 17/50* (2006.01)

(52) U.S. Cl.
USPC ........... 716/103; 716/101; 716/104; 716/106; 716/134

(58) Field of Classification Search
CPC .................. G06F 17/5022; G01R 31/31704
USPC .................. 716/100, 101, 103, 104, 106, 134
See application file for complete search history.

(56) References Cited

U.S. PATENT DOCUMENTS

| | | | |
|---|---|---|---|
| 5,200,907 A | 4/1993 | Tran | |
| 5,841,672 A * | 11/1998 | Spyrou et al. | 716/113 |
| 5,903,466 A * | 5/1999 | Beausang et al. | 716/104 |
| 6,275,973 B1 * | 8/2001 | Wein | 716/104 |
| 6,445,049 B1 | 9/2002 | Iranmanesh | |
| 6,591,401 B2 | 7/2003 | Sako | |
| 6,771,126 B2 * | 8/2004 | Blankenship et al. | 330/257 |
| 6,829,750 B2 | 12/2004 | Maki et al. | |
| 7,003,741 B2 * | 2/2006 | Srinivasan | 716/113 |
| 7,389,488 B2 * | 6/2008 | Chen et al. | 716/111 |
| 7,584,439 B2 * | 9/2009 | Carelli et al. | 716/106 |
| 2004/0194043 A1 * | 9/2004 | Sundar et al. | 716/5 |

OTHER PUBLICATIONS

D. Marković et al., "General Method in Synthesis of Pass-Transistor Circuits," 22nd International Conference on Microelectronics (MIEL), May 2000, pp. 695-698, vol. 2.
Lynne Michelle Brocco, "Macromodeling CMOS Circuits for Timing Simulation," Research Laboratory of Electronics (RLE), Massachusetts Institute of Technology, RLE Technical Report No. 529, Jun. 1987, 97 pages.
S. Uppalapati et al., "Glitch-Free Design of Low Power ASICS Using Customized Resistive Feedthrough Cells," 9th VLSI Design and Test Symposium, Aug. 2005, pp. 41-48, Bangalore, India.

* cited by examiner

*Primary Examiner* — Sun Lin
(74) *Attorney, Agent, or Firm* — Ryan, Mason & Lewis, LLP

(57) ABSTRACT

A method is provided for designing an integrated circuit. The method includes generating a net list of an integrated circuit design, wherein the net list includes one or more component cells selected from a cell library. The component cells include transmission gate logic cells and sourcing cells that drive the transmission gate logic cells. Each transmission gate logic cell has an associated timing model with a timing characteristic defined as a function of a driving strength attribute of a sourcing cell used to characterize the transmission gate logic cell. The method further includes auditing the net list to determine if a given sourcing cell in the integrated circuit design has a sufficient driving strength based at least on the driving strength attribute of a transmission gate logic cell being driven by the given sourcing cell.

20 Claims, 10 Drawing Sheets

DEPLOYMENT OF TRANSMISSION GATE LOGIC CELLS IN APPLICATION SPECIFIC INTEGRATED CIRCUITS

FIELD OF THE INVENTION

The field generally relates to systems and methods for designing integrated circuits and, in particular, systems and methods for designing and deploying transmission gate logic cells in application specific integrated circuit design flows.

BACKGROUND

In general, the design of digital integrated circuits includes two main design phases such as, for example, an RTL (register transfer level) design phase and a physical design phase. An RTL design phase is performed by converting a user specification of integrated circuit function into an RTL description, which specifies how each portion of the integrated circuit operates on each clock cycle. In the physical design phase, an integrated circuit design is generated using a corresponding RTL file and a library of standard component cells such as basic logic gates (AND gate, OR gates, NAND gates, NOR gates, etc.) and macro cells such as adders, multiplexers, flip-flops, memory, etc. More specifically, a physical design phase includes various phases such as logic synthesis, placement, clock-tree synthesis, and routing.

By design, transmission gate logic cells have fewer transistors than conventional CMOS (complementary metal oxide semiconductor) cells and, therefore, transmission gate logic cells are smaller, lower power and generally faster. However, transmission gate logic cells have certain properties such as state-dependent timing input loading and multi-port-dependent timing arcs, which preclude the use of transmission gate logic cells in standard, fast-turn application specific integrated circuit design flows. Indeed, the use of transmission gate logic cells in circuit design is limited to large-scale, full transistor-level custom design circuits and flows.

SUMMARY

In one embodiment, a method is provided for designing an integrated circuit. The method includes generating a net list of an integrated circuit design, wherein the net list includes one or more component cells selected from a cell library. The component cells include transmission gate logic cells and sourcing cells that drive the transmission gate logic cells. Each transmission gate logic cell has an associated timing model with a timing characteristic defined as a function of a driving strength attribute of a sourcing cell used to characterize the transmission gate logic cell. The method further includes auditing the net list to determine if a given sourcing cell in the integrated circuit design has sufficient driving strength based at least on the driving strength attribute of a transmission gate logic cell being driven by the given sourcing cell.

Other embodiments of the invention will become apparent.

WRITTEN DESCRIPTION

In general, embodiments of the invention as described herein include systems and methods for designing and deploying transmission gate logic cells in application specific integrated circuit design flows. The term "transmission gate logic cell" as used herein generally refers to any logic cell that implements a transmission gate circuit. For instance, examples of transmission gate logic cells are shown in FIGS. 1, 2 and 3.

Figure 1:
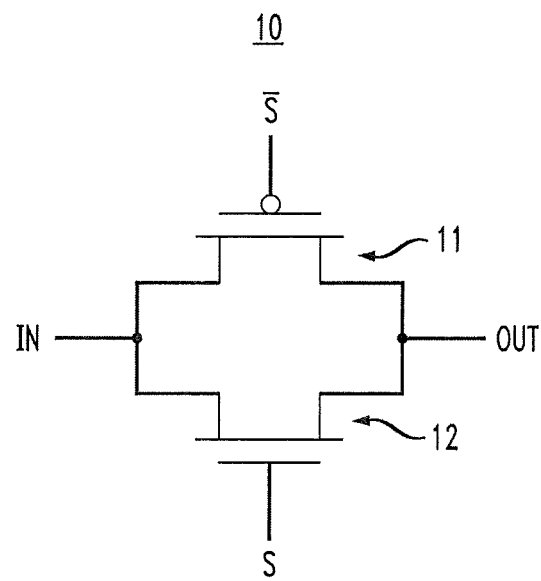
FIG. 1 illustrates an embodiment of a transmission gate logic cell.

FIG. 1 schematically illustrates an embodiment of a transmission gate logic cell. In particular, FIG. 1 shows a CMOS transmission gate 10 (or solid-state analog switch) that selectively blocks or passes a signal level from an input IN to an output OUT. The transmission gate 10 comprises a PMOS transistor 11 and an NMOS transistor 12. The control gates (gate terminals of PMOS transistor 11 and NMOS transistor 12) are biased in a complementary manner so that both transistors 11 and 12 are either turned on or turned off. In particular, when a logic "high" select (S) signal is applied, both transistors 11 and 12 are activated and pass a signal from IN to OUT. When a logic "low" select (S) signal is applied, both transistors 11 and 12 are turned off, thereby forcing a high-impedance condition on both the IN and OUT nodes. FIG. 1 shows arbitrary labels for IN and OUT, as the transmission gate 10 will operate identically in a bidirectional manner without degradation of the input signal.

Figure 2:
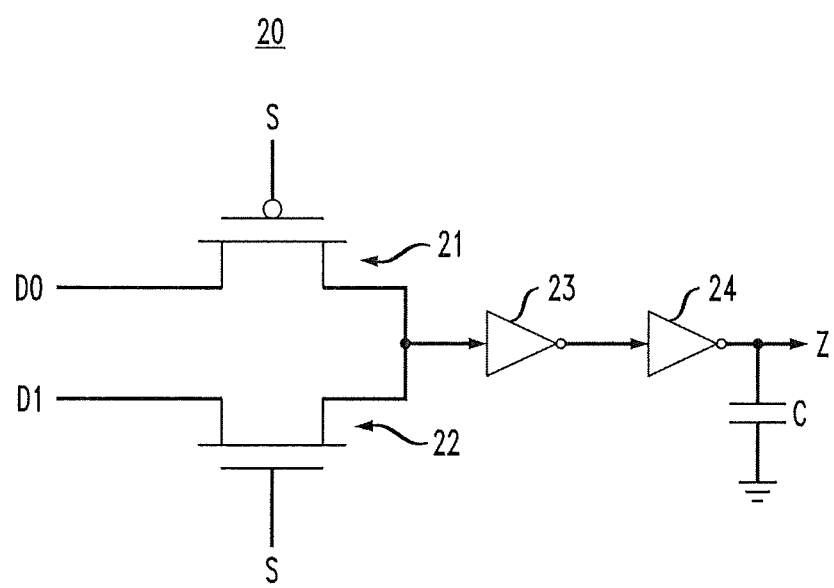
FIG. 2 illustrates another embodiment of a transmission gate logic cell.

FIG. 2 schematically illustrates another embodiment of a transmission gate logic cell. In particular, FIG. 2 shows a transmission gate-based multiplexer circuit 20 comprising a PMOS transistor 21, an NMOS transistor 22, a non-inverting buffer formed of a cascade of two inverting buffers 23 and 24, and an output capacitive load C. The transmission gate-based multiplexer circuit 20 has a first input D0, a second input D1 and an output Z. The control gates (gate terminals of PMOS transistors 21 and NMOS transistor 22) are biased with the same select control signal (S) so that only one of the transistors 21 and 22 is turned on at a given time. For instance, when the select control signal (S) is logic "low", the PMOS transistor 21 is switched on and the NMOS transistor 22 is switched off. As such, when the select control signal (S) is logic "low", the current value from the first data input D0 will propagate through the PMOS transistor 21 through the inverters 23 and 24 to the output node Z. On the other hand, when the select control signal (S) is logic "high", the PMOS transistor 21 is switched off and the NMOS transistor 22 is switched on. As such, when the select control signal (S) is logic "high", the current value from the second data input D1 will propagate through the NMOS transistor 22 through the inverters 23 and 24 to the output node Z. Therefore, the transmission gate-based multiplexer circuit 20 of FIG. 2 operates as a 2:1 multiplexer circuit, which selectively outputs an input signal at one of the inputs DO or D1 based on a polarity of the select control signal (S).

Figure 3:
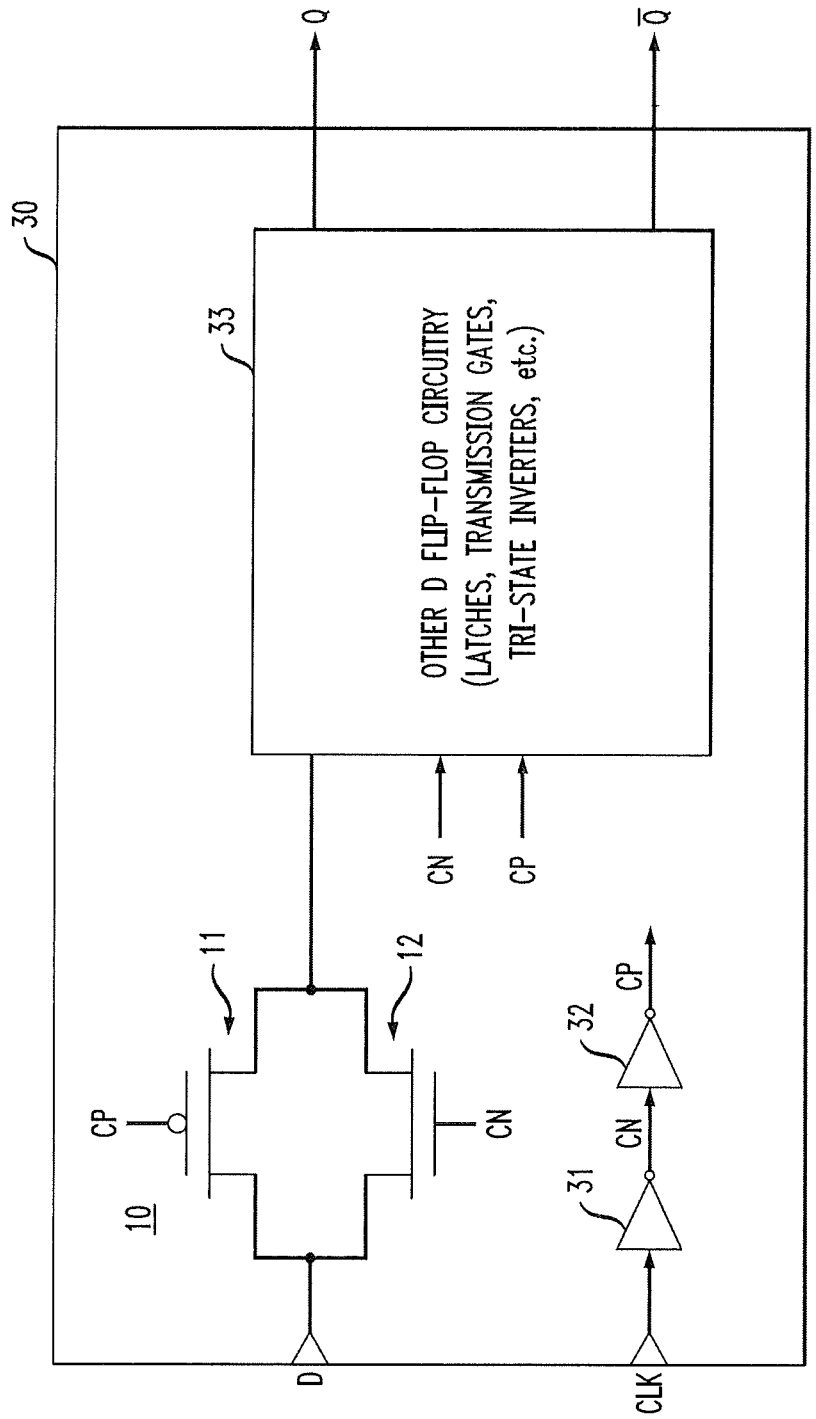
FIG. 3 illustrates yet another embodiment of a transmission gate logic cell.

FIG. 3 illustrates yet another embodiment of a transmission gate logic cell. In particular, FIG. 3 illustrates a D flip-flop circuit 30 comprising a data input D, a clock input CLK, a data output Q and an inverted data output $\overline{Q}$. First and second series-coupled inverters 31 and 32 are coupled to the clock input CLK, and generate a negative clock pulse signal, CN, and a positive clock pulse signal CP, respectively. A master stage pass gate 10 (having an architecture as shown in FIG. 1) is coupled to the data input D. An output of the master stage pass gate 10 is input to other circuitry 33 (such as latches, transmission gates, inverters, etc.) which are commonly used to build a D flip-flop circuit. The clock signals CP and CN drive the master stage pass gate 10 and other D flip-flop circuitry 33 to convey a logic state (either a logic 0 or logic 1) that is initially present at the data input port D through the master stage pass gate 10 and other circuitry 33 to the non-inverted output Q and the inverted data output $\overline{Q}$. Transmission gate logic cells such as shown in FIG. 1 are typically used as building blocks for other types of logic circuitry, such as D flip-flops as shown in FIG. 3.

Transmission gate logic cells are generally faster, smaller and operate at lower power as compared to more standard CMOS circuit topologies. However, transmission gate logic cells have properties that effectively preclude their use in standard application specific integrated circuit implementation flows. In general, standard logic cells should have certain characteristics for effective use in standard application specific integrated circuit implementation flows. For instance, a logic cell should be fully characterizable with regard to, e.g., timing parameters associated with the logic cell for particular semiconductor technologies. In one aspect, this requires that each input port of a logic cell be buffered so that each input port essentially sees a relatively state-independent load of a PMOS or NMOS gate, or both. Moreover, there should not be any delay or transition time dependence on multiple inputs of the logic cell. For example, a cell delay from a given input port of the logic cell to an output port of the logic cell (i.e., path delay) as well as an output transition time (output slew rate) should only depend on the input transition time (input slew rate) of the given input port and a load on the output port. Moreover, the state of a given input, or the driving strength of another logic cell sourcing the given input should not affect any timing related to another input port.

Although the use of transmission gate logic cells can save 10-25% in die area and power consumption, and improve speed by a similar magnitude, a variety of issues preclude their use in standard implementation flows. For instance, transmission gate logic cells can exhibit multiple-input dependence, wherein a delay from one input to an output of the transmission gate logic cell may depend on a driving strength of a sourcing cell driving an unrelated input port. By way of example, in the embodiment of FIG. 2, a delay from the select (S) port to the output (Z) port can be a function of a driving strength of other logic cells sourcing either D0 or D1. Conventional cell characterization tools, logic cell libraries and static timing tools do not support or otherwise consider multiple-input dependence for transmission gate logic cells.

Furthermore, transmission gate logic cells can exhibit effects associated with state-dependent and time-variant input load capacitance. For example, in the embodiment of FIG. 2, the inputs D0 and D1 are un-buffered inputs, which can be problematic due to non-constant loading depending on how the D0 and D1 inputs are being driven by other logic cells. Standard libraries assume that the capacitive load on the input ports (e.g., D0 and D1 in FIG. 2) are constant or otherwise fall within specified range from a minimum to a maximum input capacitance. However, with a transmission gate logic cell as shown in FIG. 2, for example, the input capacitive load on D0 and D1 can widely vary, wherein the capacitive input load of D0 or D1 is small when the transistors 21 and 22 are turned off and wherein the capacitive input load of D0 or D1 can be relatively large when transistors 21 and 22 are turned on. As such, in the embodiment of FIG. 2, the capacitive load seen on the D0 or D1 inputs depends on the S input.

While most cell timing library formats and static timing flows do support minimum and maximum input capacitances, a conventional application specific integrated circuit design flow does not consider "dip" or "glitch" effects that can occur on the logic level of the data input ports D0 or D1 when the driving strength of the sourcing cell driving the transmission gate logic cell is too small, or when a sourcing logic cell of sufficient driving strength is driving too many transmission gate logic cells, effectively resulting in a weakened driving strength for a given transmission gate logic cell. These "dip" effects on logic high levels, or "glitch" effects on logic low levels can result in "hidden" logic transitions if the dips and glitches are of sufficient magnitude.

Sequential-type transmission gate logic cells, such as the transmission gate D flip-flop shown in FIG. 3 do not generally suffer from issues regarding multiple input dependencies such as combinatorial-type transmission gate logic cells such as shown in FIGS. 1 and 2. However, sequential-type transmission gate logic cells can exhibit effects associated with state-dependent and time-variant input load capacitance. For instance, the D flip-flop of FIG. 3 can exhibit time-variant loading on the D input port. When the clock port CLK transitions from logic 1 to logic 0, or from logic 0 to logic 1, there can be glitch effects that depend on the effective driving strength of the logic cell sourcing the D input port, the number of transmission gate logic cells that may be connected to the sourcing cell, and/or the switched load of each transmission gate logic cell.

Figure 4:
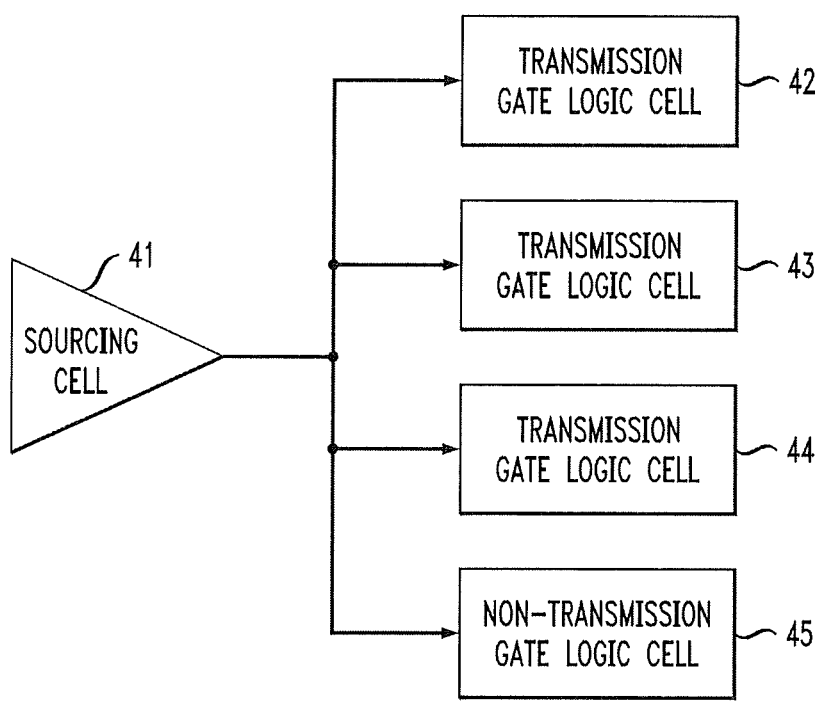
FIG. 4 illustrates an embodiment of an integrated circuit design with a sourcing cell driving multiple transmission gate logic cells and a non-transmission gate logic cell.

FIG. 4 illustrates an embodiment of an integrated circuit design with a sourcing cell driving multiple transmission gate logic cells and a non-transmission gate logic cell. In particular, FIG. 4 illustrates an integrated circuit 40 comprising a sourcing logic cell 41 that drives a plurality of transmission gate logic cells 42, 43 and 44, and a non-transmission gate logic cell 45. In the example of FIG. 4, the transmission gate logic cells 42, 43, and 44 may be any type of transmission gate-based circuit such as the combinatorial transmission gate logic cells shown in FIG. 1 or FIG. 2, or a transmission gate-based flip-flop such as shown in FIG. 3, for example. The sourcing cell 41 must be selected to have an effective driving strength that is sufficient to drive each of the transmission gate logic cells 42, 43 and 44 to avoid the dip/glitch effects as discussed above. Here, it is assumed that the non-transmission gate logic cell 45 is a logic cell that has a buffered input or otherwise has a relatively constant input capacitive load, which is not affected by the driving strength of the sourcing cell 41.

Embodiments of the invention provide methods to optimize the design of transmission gate logic cells to eliminate or mitigate the effects associated with state-dependent input capacitance and hidden timing arcs, as well as methods for implementing and deploying optimized transmission gate logic cells within a standard application specific integrated circuit design process (e.g., synthesis, place and route, gate-level static timing, etc.) without having to resort to a large-scale, full transistor-level custom design flow. Embodiments of the invention provide design techniques and methodologies to enable the use of these smaller, faster transmission gate logic cells in an augmented standard implementation application specific integrated circuit design flow.

Figure 5:
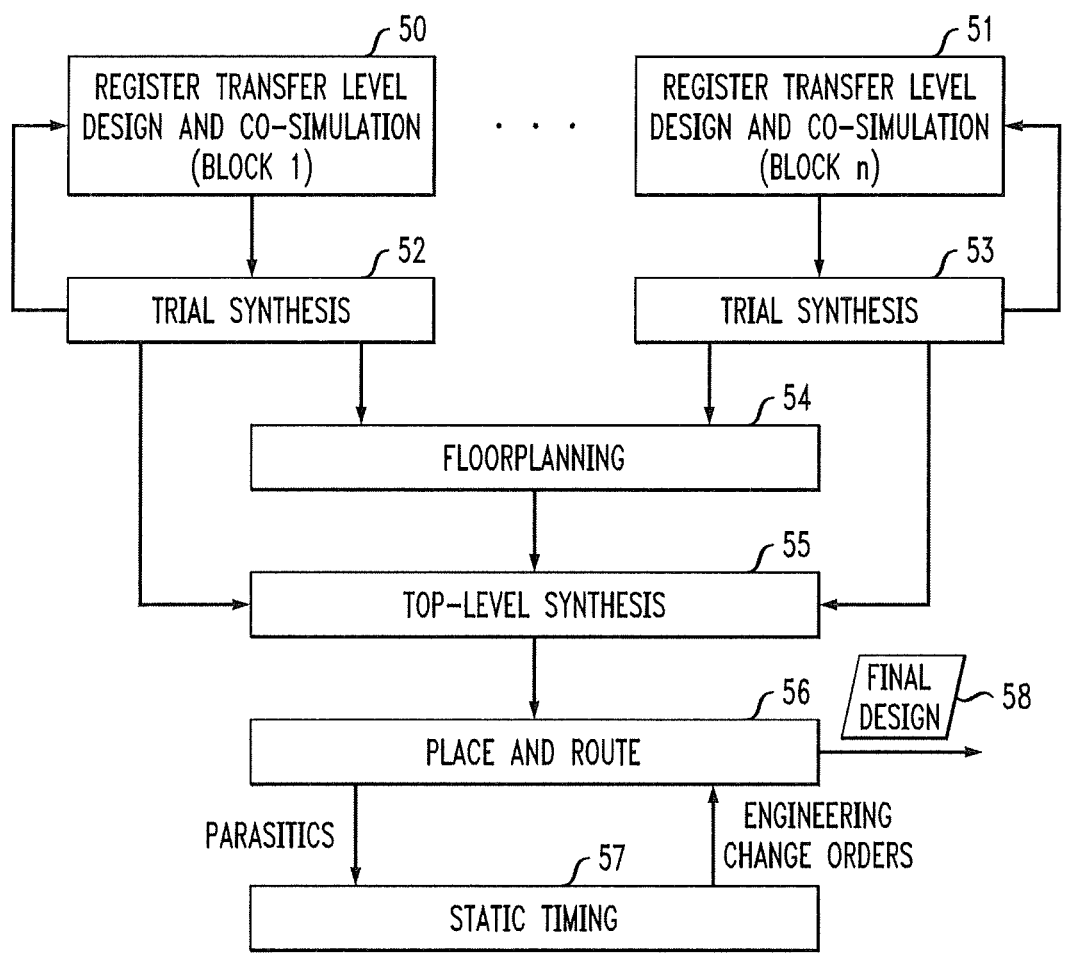
FIG. 5 illustrates a process for designing an integrated circuit.

FIG. 5 illustrates a process for designing an integrated circuit using a standard application specific integrated circuit process flow. Referring to FIG. 5, a first step in the design flow includes performing an RTL design phase by converting a user specification of integrated circuit function of n different blocks of the integrated circuit (Block 1 to Block n) into an RTL description, which specifies how each portion of the integrated circuit operates on each clock cycle, as well as performing a co-simulation on each circuit block (blocks 50 and 51). A co-simulation process involves using a simulation program to compare a given RTL design with predefined circuit models to determine if the RTL design provides an expected functionality.

A next step in the design flow is to perform a trial synthesis process (blocks 52 and 53) (or logic synthesis) on each RTL design to generate a gate level representation (net list) of the corresponding circuit block of the integrated circuit design using various library components (or "component cells") such as macro cells (e.g., adders, multiplexers, banks of flip-flops, memory, etc.), logic gates (e.g., AND gates, OR gates, etc.), other logic circuits (e.g., flip-flops), and CDC circuits, which are selected from a given cell library. In this process, an RTL (or other abstract form of desired circuit behavior) can be mapped into a gate-level net list in a target technology in which the integrated circuit will be designed using the selected library components. In accordance with embodiments of the invention, one or more transmission gate logic cells, which are characterized and defined using methods discussed below, can be accessed from the component cell library for performing the initial stages of trial (logic) synthesis.

A next step involves performing a floor planning (or placement) process (block 54) wherein the various library components in each net list (generated in blocks 52 and 53) are assigned to non-overlapping locations on an integrated circuit die area. Next, a top-level synthesis process is performed (block 55) to build one or more signal distribution networks that are connected to the inputs of component logic cells in the integrated circuit design. In this process, a signal distribution network, such as a clock distribution network or a data signal distribution network, is constructed and added in the integrated circuit design.

In one embodiment, the signal distribution network process involves constructing and inserting balanced buffered clock trees into the physical design, which distributes a clock signal from a common clock source to one or more target component cells (e.g., flip-flop) at one or more destination points, which operate using the clock signal. Ideally, a clock signal will arrive to all target elements at the same time. Due to variations in buffering, loading, and interconnect lengths, however, the clock signal is skewed. A clock signal or data signal distribution network insertion tool according to an embodiment of the invention evaluates the loading and positioning of all clock and/or data related signals and places buffers in the appropriate points of the die to minimize skew to acceptable levels. In an embodiment, during the signal distribution network synthesis process, a delay balancing process (for data and/or clock signals) will be performed on the integrated circuit design up to the input pins of the selected transmission gate logic cells, for example.

After the signal distribution network synthesis stage is complete, a next step in the design process of FIG. 5 involves performing a placement and routing process to place component cells in the integrated circuit design and add wiring to the integrated circuit design (block 56). A routing process adds the wires that are needed to properly connect the placed component cells while obeying all design rules for the integrated circuit design. Techniques for placement and adding wiring to integrated circuit designs are well known to those of ordinary skill in the art.

A next step in the design process is to perform a static timing analysis to determine if timing constraints for the integrated circuit design are satisfied (block 57). Static timing analysis is a process of computing the expected timing of a digital circuit without requiring simulation. For example, timing analysis is performed on the current integrated circuit design to determine if clock latencies to macro cells or other circuit components are acceptable or not, or whether latencies in data paths are acceptable or not, etc. The static timing analysis may be performed using known static timing analysis tools such as PEARL During a static timing analysis, a tool, such as PEARL, uses certain data files such as parasitics data, timing libraries, net list files, technology files, etc., to perform a static timing analysis.

If it is determined that a given timing constraint for the integrated circuit design is not satisfied, then one or more engineering change orders are generated for use in the place and route design phase (block 56) to modify the integrated circuit design to meet the given timing constraint(s). The static timing analysis (block 57) and place and route process (block 56) are repeated in an iterative manner until all timing constraints are satisfied, and timing closure is met. Thereafter, any remaining design/analysis steps can be performed, which are commonly employed to complete an integrated circuit design. Once the design is complete and has met all constraints, the final design is generated and output (block 58).

Figure 6:
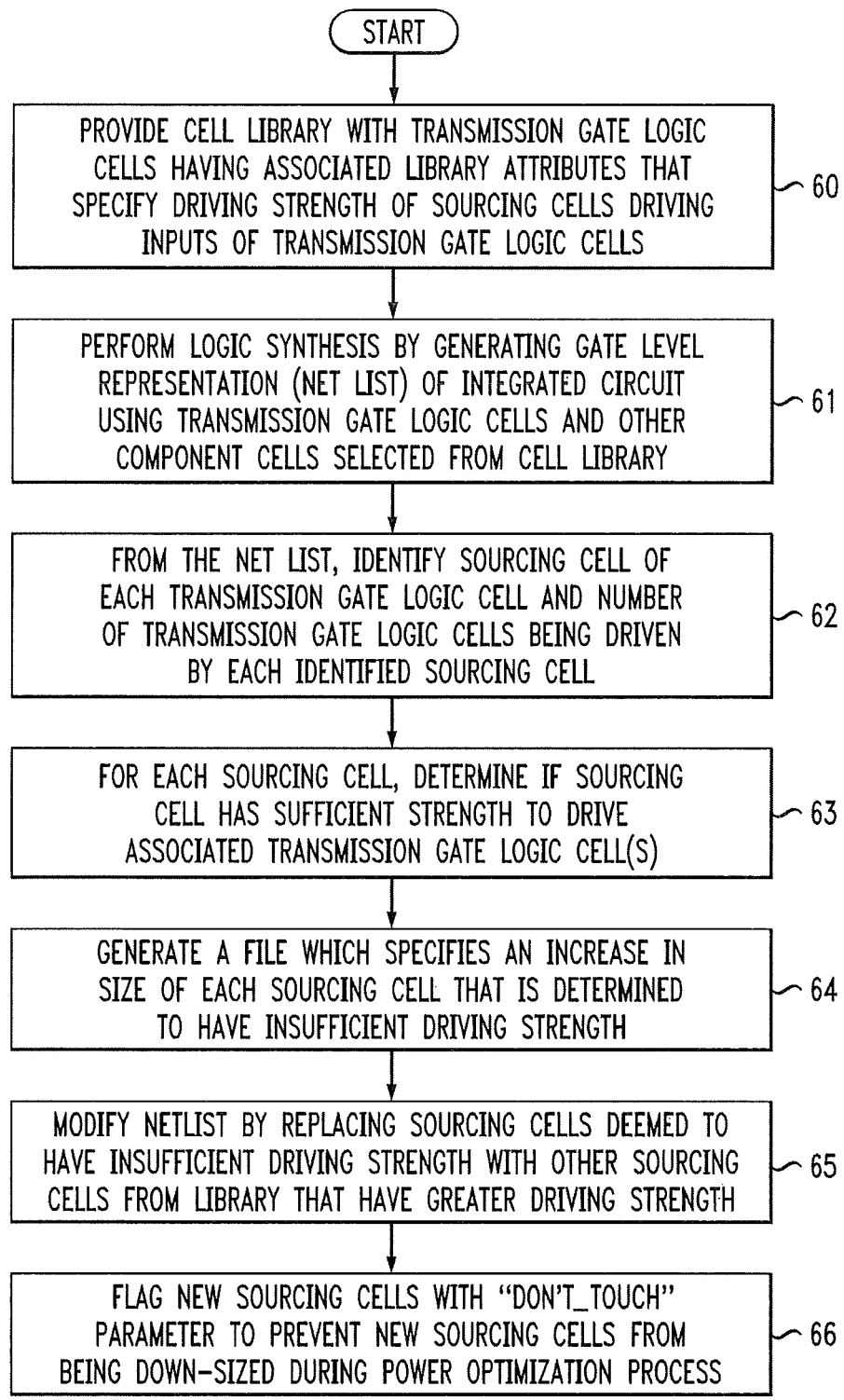
FIG. 6 illustrates a method for designing an integrated circuit using transmission gate logic cells according to an embodiment of the invention.

FIG. 6 illustrates a method for designing an integrated circuit using transmission gate logic cells according to an embodiment of the invention. More specifically, FIG. 6 is a high-level flow diagram of a method for implementing and deploying transmission gate logic cells in an application specific integrated circuit design flow according to an embodiment of the invention. An initial step includes providing a component cell library comprising various component cells including transmission gate logic cells with associated library attributes that specify an effective driving strength of sourcing cells that were used to drive the transmission gate logic cells during a characterization process (block 60). Embodiments of the invention include methods for building transmission gate logic cells such as combinatorial transmission gate cells (FIGS. 1 and 2) and flip-flop transmission gate cells (FIG. 3) using cell characterization and optimization methods that will be discussed in further detail below with reference to FIGS. 7A and 7B, for example.

In general, transmission gate logic cell characterization and optimization methods according to embodiments of the invention involve building transmission gate logic cells with optimized architectures that minimize the effects associated with state-dependent and time-variant input load capacitance. Moreover, for combinatorial transmission gate cells, associated timing models are defined to include related drive-strength attributes that specify a driving strength of sourcing cells that were used to drive the each input of the transmission gate logic cell during the characterization and optimization process.

Moreover, a component cell library includes auxiliary library files that are associated with component logic cells that can be utilized as sourcing cells to drive transmission gate logic cells. The auxiliary library files comprise metrics that define a relative drive strength for component logic cells that are used as sourcing cells. In one embodiment of the invention, a driving strength attribute of a sourcing cell is defined by a name that includes the cell type (inverter, buffer, . . . ), the size of an output stage of the sourcing cell (X1, X2, . . . ), a threshold voltage, and critical dimension (CD). These metrics are used for determining if a given transmission gate logic cell is sourced from a sufficiently strong sourcing cell so that the timing information that will be pulled from the library is accurate and that the state-dependent "glitching" is acceptable. In one embodiment of the invention, based on simulations and heuristics, a relative driving strength is defined as follows:

$$Ds = \frac{S_X * S_{Vt} * S_{CD}}{S_S},\qquad \text{Eqn. (1)}$$

The parameter $S_X$ denotes a cell drive-width multiplier. For example, a single drive inverter named "INV1X" can have a cell drive-width multiplier $S_X=1$, a double strength inverter named "INV2X" can have a cell drive-width multiplier $S_X=2$, etc.

The parameter $S_{Vt}$ is a simulation derived scale factor for threshold voltage. As explained in further detail below, the metric Ds is used in ratio calculations, so an absolute strength is not needed. Therefore, by way of example, the parameter $S_{Vt}$ can be defined by assigning a standard-Vt cell with a value of $S_{Vt}=1.0$, assigning a low-Vt cell with a value of $S_{Vt}>1.0$, and assigning a high-Vt cell with a value of $S_{Vt}<1.0$.

The parameter $S_{CD}$ corresponds to a critical dimension (CD) of the sourcing cell. For example, in a 40 nm semiconductor technology library, a sourcing cell could have a parameter value of $S_{CD}$ that denotes one of a 40 nm, 45 nm, or 50 nm critical dimension factor.

The parameter $S_S$ is a stacking factor based on the structure of the output stage of the driving cell. By way of example, for simple cells such as inverters and buffers, the value of $S_S=1$. For un-buffered NAND and NOR gates, for example, the stacking factor value can be, e.g., $S_S=2$ or $S_S=3$.

Referring back to FIG. 6, a next step in the design flow is to perform a logic synthesis process to generate a gate level representation (or net list) of the integrated circuit design using transmission gate logic cells and other component cells selected from the component cell library (block 61). This process may be implemented using known logic synthesis techniques and tools that generate a net list from an RTL file (or other abstract representation) by selecting appropriate component cells from the target component cell library. A synthesis tool typically receives an RTL hardware description and a standard cell library as input and produces a gate-level net list as output. The resulting gate-level net list is a structural description with standard cells at the leaves of the design. During this process, the synthesis tool performs many steps including high-level RTL optimizations, RTL to un-optimized Boolean logic, technology independent optimizations, and technology mapping to the available standard cells. In accordance with embodiments of the invention, a target standard cell library includes various types of optimized transmission gate logic cells and associated driving strength attributes as discussed herein, which are used to ensure proper timing and behavior when synthesized into a net list.

Once the net list is generated with transmission gate logic cells, an auditing process is performed (blocks 62, 63 and 64) to ensure that the sourcing cells driving the transmission gate logic cells in the net list have sufficient drive strength and, thus, ensure proper timing and minimal "glitching". In one embodiment, an auditing process includes an initial step of identifying, from the net list, a sourcing cell driving each transmission gate logic cell in the net list, and determining a number of transmission gate logic cells being driven by each identified sourcing cell (block 62). In one embodiment of the invention, this process is implemented using a scripting program (e.g., TCL script) that can run under either a Synopsis DC tool or a PT-shells tool, for example. The result of this process is a file that identifies each sourcing cell of each transmission gate logic cell and the number of transmission gate logic cells per sourcing cell. For example, based on the integrated circuit shown in FIG. 4, the resulting file would identify the sourcing cell 41 an identify each transmission gate logic cell 42, 43 and 44 being driven by the sourcing cell 41. The non-transmission gate logic cell 45 shown in FIG. 4 would not be considered in this process.

A next step in the auditing process includes for each identified sourcing cell, determining if the sourcing cell has sufficient strength to drive the one or more transmission gate logic cells being driven by the sourcing cell (block 63). In one embodiment of the invention, an auditing process is performed using PEARL program. This process will vary depending on the type of transmission gate logic cell being considered. Various methods for determining if a sourcing cell has sufficient driving strength according to embodiments of the invention will be discussed in further detail below with reference to FIGS. 8 and 9.

A file is then generated which specifies an increase in the size of each sourcing cell that is deemed to have insufficient driving strength (bock 64). The net list is then modified by replacing those sourcing cells deemed to have insufficient driving strength with other sourcing cells from the target component cell library that have greater driving strength (block 65). The newly added sourcing cells are then flagged with a "don't_touch" parameter which prevents the newly added sourcing cells from being downsized during a subsequent power optimization process, for example (block 66). In one embodiment of the invention, the auditing process flow of blocks 62, 63, 64, 65, and 66 are performed during an initial timing closure ECO following a place and route design phase.

Figure 7A:
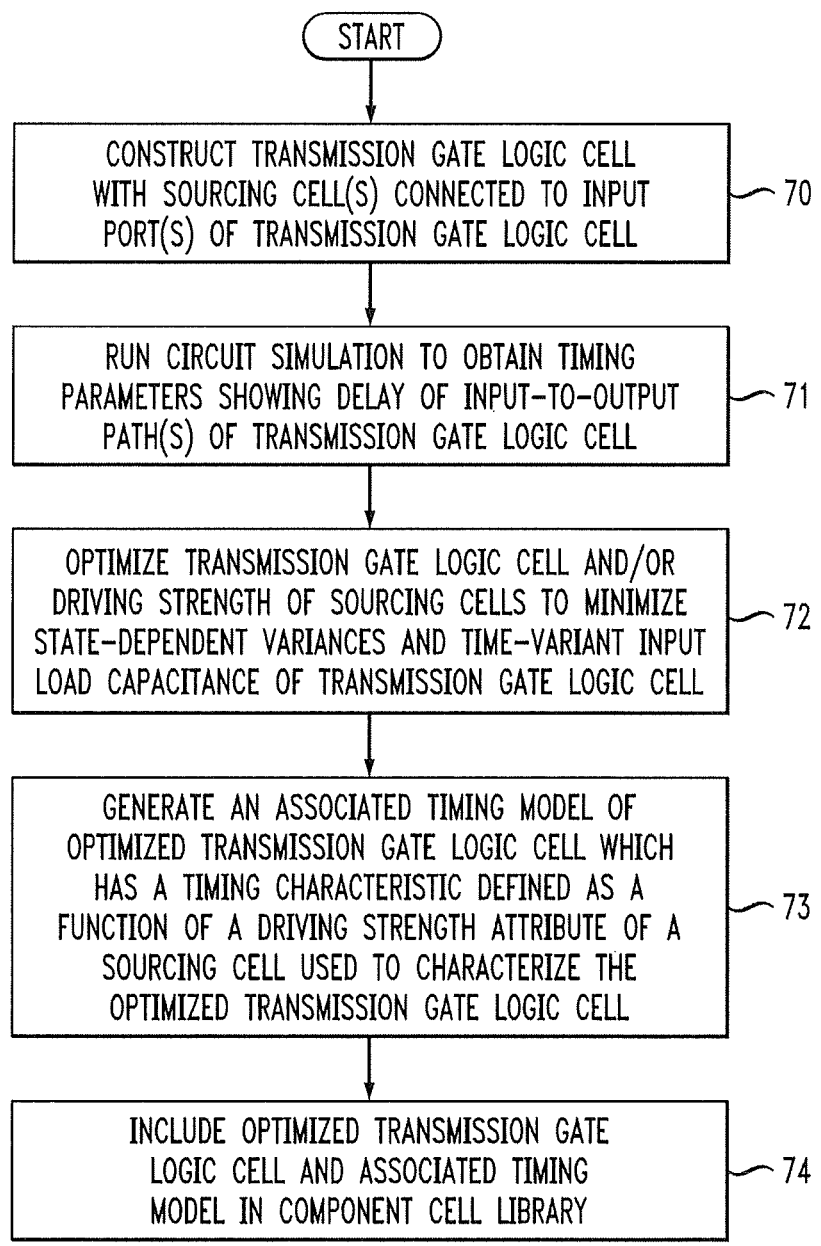
FIG. 7A illustrates a method for generating a transmission gate logic cell and associated library attributes for use in a component cell library according to an embodiment of the invention.

FIG. 7A illustrates a method for generating a transmission gate logic cell and associated library attributes for use in a component cell library according to an embodiment of the invention. More specifically, FIG. 7A illustrates a method for building a combinatorial transmission gate logic cell (e.g., FIG. 1 or 2) and associated driving strength attribute for inclusion in a component cell library, according to an embodiment of the invention. A first step includes constructing a transmission gate logic cell having a sourcing cell connected to each input port of the transmission gate logic cell (block 70). For example, this process may include constructing a circuit including a combinatorial transmission gate logic cell such as shown in FIGS. 1 or FIG. 2 with a sourcing cell connected to each input port (e.g., IN port of FIG. 1, or D0 and D1 ports in FIG. 2) of the transmission gate logic cell.

A next step includes performing a circuit simulation to obtain timing parameters that show a delay of each input-to-output path of the transmission gate logic cell (block 71). For example, in the embodiment shown in FIG. 2, for one of the given inputs D0 and D1, the delay (timing arc) from the select port S to the output port Z (i.e., D(S→Z)) is a function of load capacitance ($C_{load}$), a slope (transition time) of the select signal S ($T_S$) and a function of a driving strength of a sourcing cell driving the input port D0 or D1 (f(D0) or f(D1)), i.e., D(S→Z)=F($C_{load}$,$T_S$,f(D0) or f(D1)).

Following a circuit simulation process, depending on the results of the simulation, an optimization process can be performed to optimize the circuit architecture of the transmission gate logic cell and/or change the driving strength of the sourcing cells driving the input ports of the transmission gate logic cell to obtain desired timing characteristics (block 72). In one embodiment, this process involves optimizing the transmission gate logic cell architecture to minimize a capacitive "kick" effect. For example, in the embodiments shown in FIGS. 1 and 2, for example, circuit optimization can include down-sizing the PMOS and NMOS transistors to reduce the input capacitance seen on the input ports, and then optimizing the design of the circuitry (e.g., buffers) following the input PMOS and NMOS transistors to compensate for the smaller size of the input PMOS and NMOS transistors. Moreover, for a combinatorial transmission gate logic cell as shown in FIGS. 1 and 2, for example, the delay from one port may be dependent on the driving strength of the cell sourcing a different port. For example, in the MUX-based transmission gate logic cell of FIG. 2, the delay in the timing arc from S to Z will depend on the driving strength of the logic cells sourcing D0 and D1. In this regard, an optimization process may replace the logic cells sourcing D0 and/or D1 to obtain better delay characteristics. In the process flow of FIG. 7A, blocks 71 and 72 comprise an iterative process that is repeated until the desired delay characteristics are obtained and an optimized transmission gate logic cell is created.

Once the optimization process is complete for a given transmission gate logic cell, a next step includes generating an associated timing model for the optimized transmission gate logic cell design, which has a timing characteristic defined as a function of a driving strength attribute of a sourcing cell used to characterize the transmission gate logic cell (block 73). In this process, a standard timing model (look-up table structure) which specifies the delay for each I/O path of the transmission gate logic cell can be augmented with an attribute (tg-driving-cell) that specifies a sourcing cell with a given effective driving strength. More specifically, this attribute describes the effective driving strength of the sourcing cell that was used during the characterization process to source the related input port of the optimized transmission gate logic cell design. For example, in the MUX embodiment of FIG. 2, when the timing arc from S to Z is being library characterized, we list in the component cell library what component cells were used to source D0 and D1. A standard LIBERTY timing model format can be augmented to include a "tg-driving-cell" attribute that is used in during an auditing process as discussed herein. The optimized transmission gate logic cell and associated timing model are added to a component cell library (block 74) for use in an application specific integrated circuit design flow, as discussed herein.

Figure 7B:
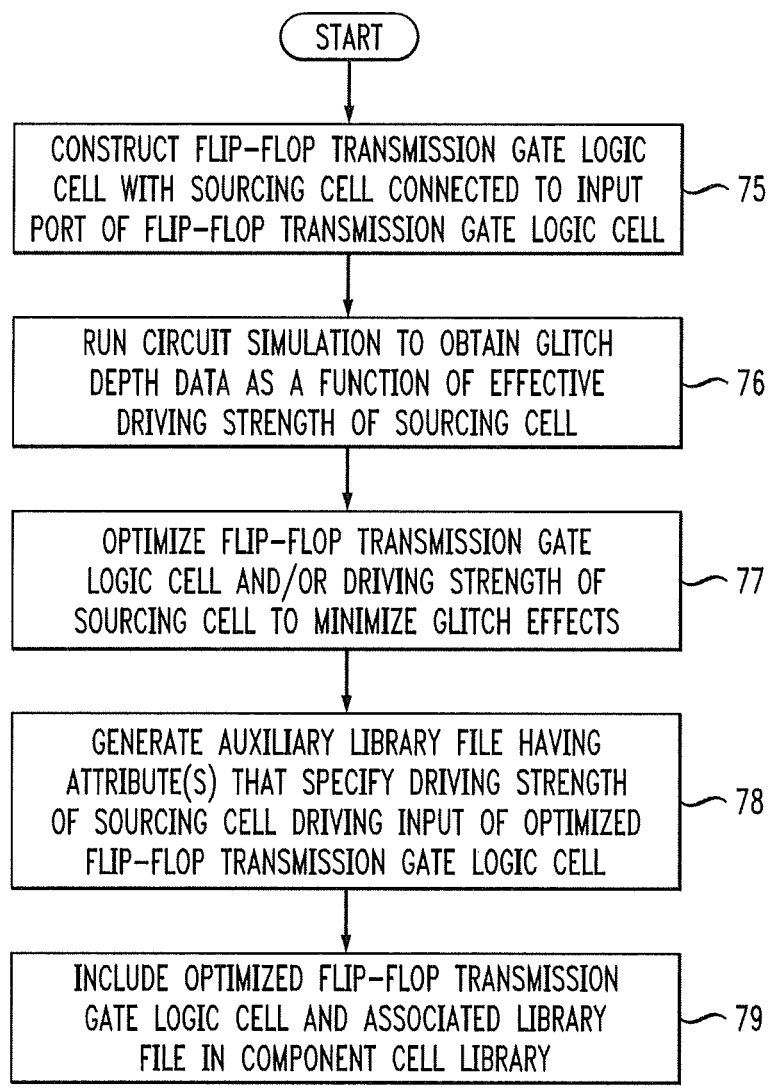
FIG. 7B illustrates a method for generating a transmission gate logic cell and associated library attributes for use in a component cell library according to another embodiment of the invention.

FIG. 7B illustrates a method for generating a transmission gate logic cell and associated library attributes for use in a component cell library according to another embodiment of the invention. More specifically, FIG. 7B illustrates a method for building a flip-flop based transmission gate logic cell and associated library attributes for inclusion in a component cell library, according to an embodiment of the invention. A first step includes constructing a flip-flop-based transmission gate logic cell having a sourcing cell connected to the input port of the flip-flop based transmission gate logic cell (block 75). For example, this process may include constructing a circuit including a D flip-flop transmission gate logic cell such as shown in FIG. 3 with a sourcing cell connected to the D input port of the D flip-flop transmission gate logic cell.

A next step includes performing a circuit simulation to obtain timing parameters showing glitch depth data as a function of the effective driving strength of the logic cell sourcing the data input of the flip-flop transmission gate logic cell (block 76). As noted above, a flip-flop transmission gate logic cell can exhibit glitch effects associated with state-dependent and time-variant input load capacitance, wherein the D flip-flop of FIG. 3, for example, can exhibit time-variant loading on the D input port. When the clock port CLK transitions from logic 1 to logic 0, or from logic 0 to logic 1, there can be glitch effects that depend on the effective driving strength of the logic cell sourcing the D input port, the number of transmission gate logic cells that may be connected to the sourcing cell, and/or the switched load of each transmission gate logic cell.

Following a circuit simulation process, depending on the results of the simulation, an optimization process can be performed to optimize the circuit architecture of the flip-flop transmission gate logic cell and/or change the driving strength of the sourcing cell driving the input data port of the flip-flop transmission gate logic cell to obtain minimize the glitch effects and obtain desired timing characteristics (block 77). In one embodiment, this process involves optimizing the flip-flop transmission gate logic cell architecture to minimize the capacitive kick effect. For example, in the embodiment shown in FIG. 3, for example, circuit optimization can include down-sizing the PMOS and NMOS transistors of the master pass gate 10 to reduce the input capacitance seen on the input ports, and then optimizing the design of the remaining flip-flop circuitry 33 to compensate for the smaller size PMOS and NMOS transistors of the master pass gate 10. Moreover, an optimization process may include replacing the logic cell sourcing the data input D to reduce the glitch effects. In the process flow of FIG. 7B, blocks 76 and 77 comprise an iterative process that is repeated until the desired delay characteristics are obtained and an optimized flip-flop transmission gate logic cell is created.

Once the optimization process is complete for a given flip-flop transmission gate logic cell, a next step includes generating an auxiliary file associated with the optimized flip-flop transmission gate logic cell design, which specifies an effective driving strength of a sourcing cell used to characterize the transmission gate logic cell (block 78). The optimized flip-flop transmission gate logic cell and associated library file are added to a component cell library (block 79) for use in an application specific integrated circuit design flow as discussed herein.

Figure 8:
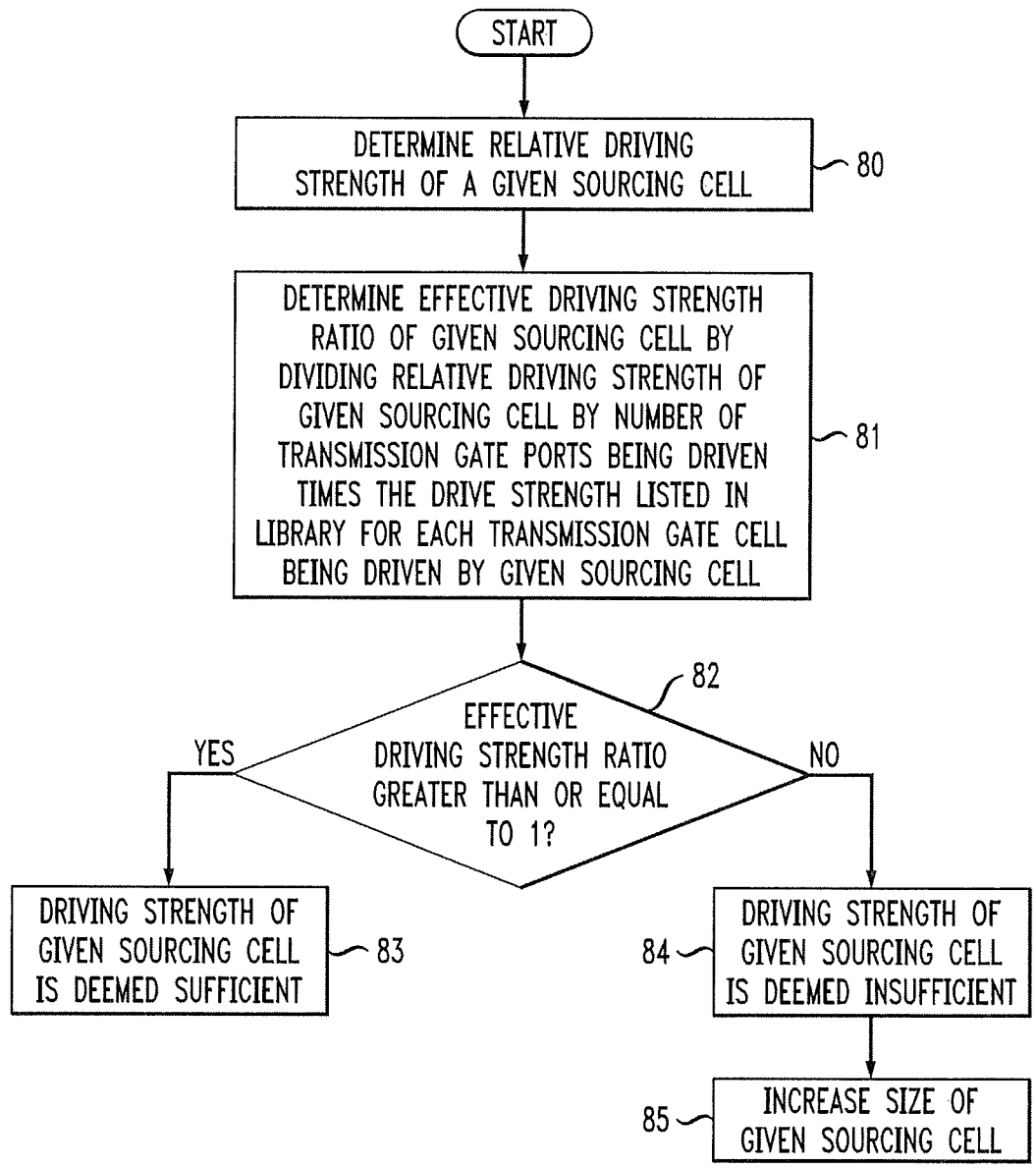
FIG. 8 illustrates a method for auditing a net list of an integrated circuit design to determine if sourcing cells have sufficient strength to drive transmission gate logic cells, according to an embodiment of the invention.

FIG. 8 illustrates a method for auditing a net list of an integrated circuit design to determine if sourcing cells have sufficient strength to drive transmission gate logic cells, according to an embodiment of the invention. More specifically, FIG. 8 illustrates a process flow for implementing block 63 of FIG. 6 with regard to determining if a given sourcing cell has sufficient strength for driving a combinatorial transmission gate logic cell, according to an embodiment of the invention. An initial step in the audit process includes determining a relative driving strength of the given sourcing cell (block 80). In one embodiment of the invention, this process is performed by computing the sourcing cell drive strength using Eqn. 1, as previously described.

A next step in the audit process is to determine an effective driving strength ratio (Comb_Ratio) of the given sourcing cell driving one or more combinatorial transmission gate logic cells as follows (block 81):

$$\text{Comb\_Ratio} = \frac{D_S(\text{TG\_driver})}{N\_TG * D_S(\text{lib\_cell})}, \quad \text{Eqn. (2)}$$

where $D_S(\text{TG\_driver})$ is the effective driving strength of the particular instance of the sourcing cell driving the combinatorial transmission gate logic cell(s) (as computed from Eqn. 1), wherein N_TG is the integer number of input ports being driven by the given sourcing cell (excluding input ports of non-transmission gate logic cells), and where $D_S(\text{lib\_cell})$ is the drive strength attribute listed in the library for each of the transmission gate logic cells being driven by the given sourcing cell.

A determination is made as to whether the effective driving strength ratio (Comb_Ratio) is equal to or greater than 1 (block 82). If the effective driving strength ratio (Comb_Ratio) is greater than or equal to 1, then the driving strength of the given sourcing cell is deemed sufficient (block 83). On the other hand, if the effective driving strength ratio (Comb_Ratio) is not greater than or equal to 1, then the driving strength of the given sourcing cell is deemed insufficient (block 84). Then, the auditing process will increase the size (driving strength) of the give sourcing cell accordingly (block 85).

Figure 9:
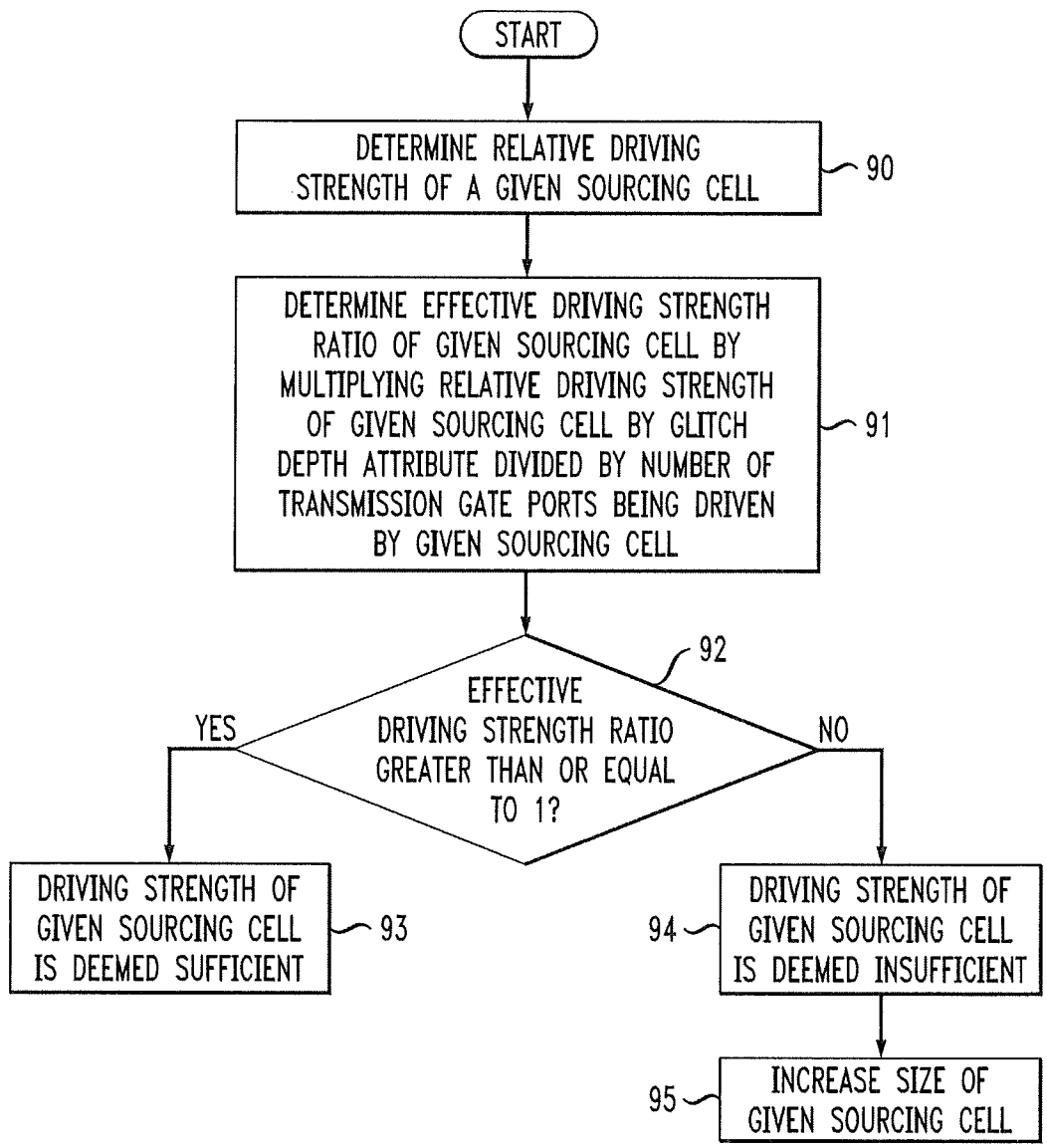
FIG. 9 illustrates a method for auditing a net list of an integrated circuit design to determine if sourcing cells have sufficient strength to drive transmission gate logic cells, according to another embodiment of the invention.

FIG. 9 illustrates a method for auditing a net list of an integrated circuit design to determine if sourcing cells have sufficient strength to drive transmission gate logic cells, according to another embodiment of the invention. More specifically, FIG. 9 illustrates a process flow for implementing block 63 of FIG. 6 with regard to determining if a given sourcing cell has sufficient strength for driving a flip-flop transmission gate logic cell, according to an embodiment of the invention. An initial step in the audit process includes determining a relative driving strength of the given sourcing cell (block 90). In one embodiment of the invention, this process is performed by computing a sourcing cell drive strength using Eqn. 1, as previously described.

A next step in the audit process is to determine an effective driving strength ratio (FF_Ratio) of the given sourcing cell driving one or more flip-flop transmission gate logic cells as follows (block 91), which focuses on glitch behavior:

$$\text{FF\_Ratio} = \frac{Gf * D_S(\text{TG\_driver})}{N\_TG} \quad \text{Eqn. (3)}$$

where $D_S(\text{TG\_driver})$ is the effective driving strength of the particular instance of the sourcing cell driving the combinatorial transmission gate logic cell(s) (as computed from Eqn. 1), wherein N_TG is the integer number of input ports being driven by the given sourcing cell (excluding input ports of non-transmission gate logic cells), and where Gf is a parameter that is derived from simulations where the "glitch" depth is determined as a function of effective drive strength.

A determination is made as to whether the effective driving strength ratio (FF_Ratio) is equal to or greater than 1 (block 92). If the effective driving strength ratio (FF_Ratio) is greater than or equal to 1, then the driving strength of the given sourcing cell is deemed sufficient (block 93). On the other hand, if the effective driving strength ratio (FF_Ratio) is not greater than or equal to 1, then the driving strength of the given sourcing cell is deemed insufficient (block 94). Then, the auditing process will increase the size (driving strength) of the give sourcing cell accordingly (block 95), or otherwise change the voltage threshold Vt and/or change the CD of the sourcing cell in addition to, or in lieu of, changing the size of the given sourcing cell.

Figure 10:
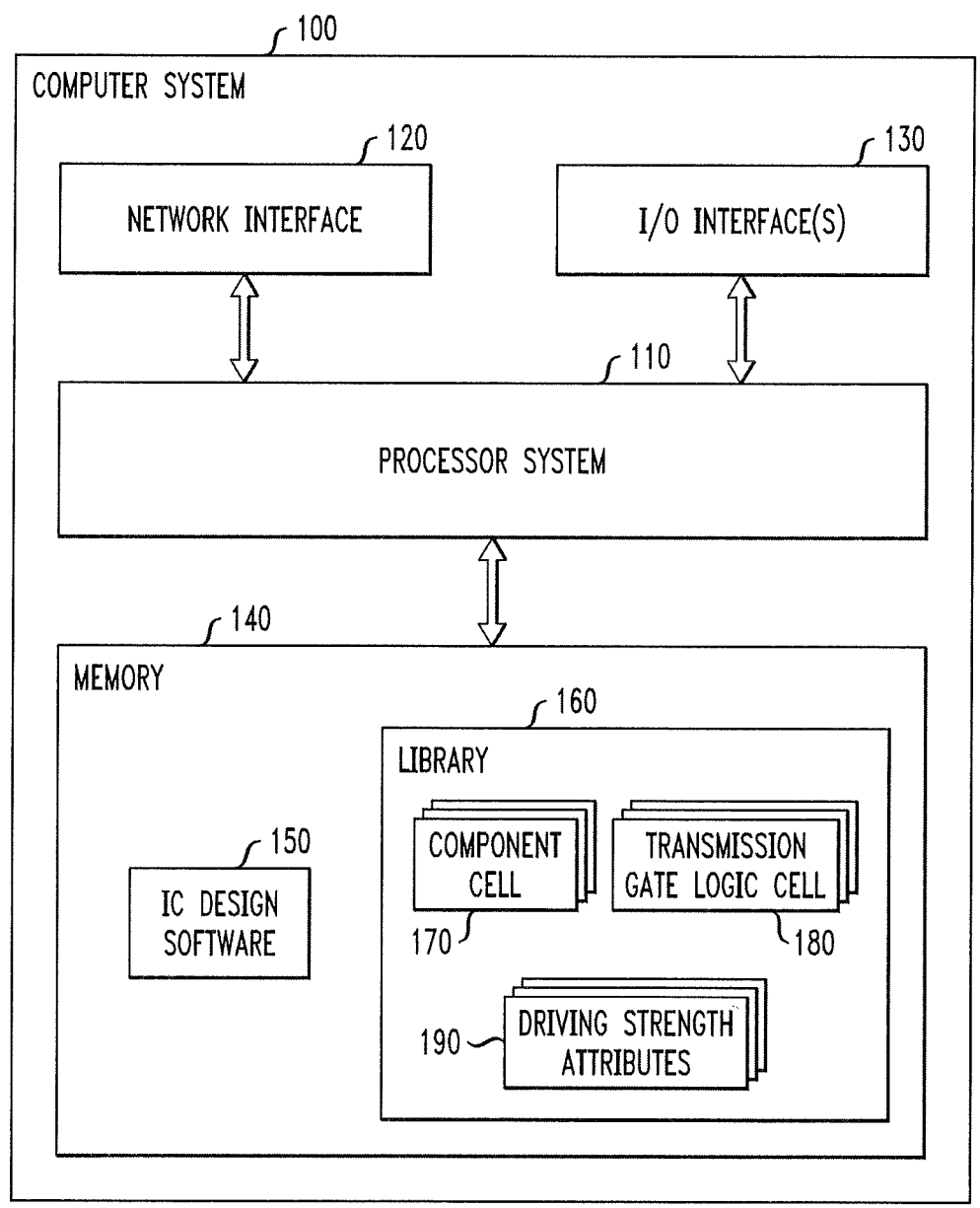
FIG. 10 is a high-level block diagram of a computing system for designing an integrated circuit chip according to an embodiment of the invention.

It is to be understood that in some embodiments, the various integrated circuit design steps described herein, such as those steps shown and discussed above with reference to FIGS. 5, 6, 7A, 7B, 8 and 9 may be embodied in program code (software programs) which is executable by a computing system to implement the various integrated circuit design steps. For instance, FIG. 10 is a high-level block diagram of a computing system 100 for designing an integrated circuit chip according to an embodiment of the invention. In general, the computing system 100 comprises a processor system 110, a network interface 120, one or more input/output (I/O) interfaces 130, and a memory system 140 which stores, for example, integrated circuit design software 150 and a component cell library 160 comprising various component cells 170 (such as macro cells), transmission gate logic cells 180, and driving strength data 190 (auxiliary files, timing models, etc.).

The network interface 120 is coupled to the processor system 110 to provide an interface that allows the processor system 110 to communicate with other systems and devices over one or more networks. The network interface 120 may comprise one or more transceivers. The I/O interface(s) 130 is/are coupled to the processor system 110 to provide an interface that allows the processor system 110 to communicate with one or more external devices such as a keyboard, a pointing device, a display, etc. The processor system 110 is coupled to the memory 140 to execute program instructions (e.g., integrated circuit design software 150) and access associated data (e.g., library components 170, 180, 190) for designing an integrated circuit using techniques as discussed herein.

For instance, the integrated circuit design software 150 may include one or more software programs for implementing an RTL design phase to convert a user specification of chip function into an RTL description, and various phase of a physical design phase including, but not limited to, logic synthesis, placement, signal distribution network synthesis, routing, timing analysis and auditing, using the various components 170, 180 and 190 of the cell library 160 stored in memory 140. The memory 140 is an example of what is more generally referred to herein as a computer readable storage medium or other type of computer program product having computer program code tangibly embodied thereon. The memory 140 may comprise, for example, electronic memory such as RAM or ROM, magnetic memory, optical memory, or other types of storage devices in any combination. The processor system 110 may comprise a microprocessor, CPU, ASIC, FPGA or other type of processing device, as well as portions or combinations of such devices.

Furthermore, embodiments of the invention may be implemented in the form of integrated circuits such as shown in FIGS. 1, 2 and 3. In an integrated circuit implementation, identical dies are typically formed in a repeated pattern on a surface of a semiconductor wafer. Each die includes one or more circuit cores and circuitry as described herein, and may include other structures or circuits. The individual die are cut or diced from the wafer, and then each die is packaged as an integrated circuit. One skilled in the art would know how to dice wafers and package die to produce integrated circuits. Integrated circuits so manufactured are considered embodiments of this invention.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims

What is claimed is:

1. A method of designing an integrated circuit, comprising:
generating a net list of an integrated circuit design, wherein the net list comprises one or more component cells selected from a cell library, wherein the component cells include transmission gate logic cells and sourcing cells that drive the transmission gate logic cells, wherein each transmission gate logic cell has an associated timing model with a timing characteristic defined as a function of a driving strength attribute of a sourcing cell used to characterize the transmission gate logic cell; and
auditing the net list to determine if a given sourcing cell in the integrated circuit design has a sufficient driving strength based at least on the driving strength attribute of a transmission gate logic cell being driven by the given sourcing cell,
wherein the generating step and the auditing step are automated steps performed by a computer.

2. The method of claim 1, wherein the auditing step comprises:
identifying, from the net list, a sourcing cell associated with each transmission gate logic cell in the integrated circuit design, and a number of transmission gate logic cells driven by each identified sourcing cell; and
for each sourcing cell in the integrated circuit design, determining if the sourcing cell has a sufficient driving strength, wherein said determining is based at least on the driving strength attribute associated with each transmission gate logic cell being driven by the sourcing cell and a number of transmission gate logic cells being driven by the sourcing cell.

3. The method of claim 1, further comprising, if a given sourcing cell is determined to have an insufficient driving strength, automatically selecting another sourcing cell having a driving strength that is greater than a driving strength of the given sourcing cell.

4. The method of claim 1, wherein the timing characteristic includes a delay from an input port to an output port of the transmission gate logic cell.

5. The method of claim 4, wherein the input port comprises a select port of a combinatorial transmission gate logic cell.

6. The method of claim 4, wherein the input port comprises a data input port of a transmission gate-based flip-flop logic cell.

7. The method of claim 1, wherein the auditing step is implemented by a script that is executed as part of a static timing process of an integrated circuit design tool.

8. A non-transitory computer readable storage medium comprising a program of instructions which, when executed by a computer, perform the method steps of claim 1 for designing an integrated circuit.

9. A computing system, comprising:
a memory to store program instructions for designing an integrated circuit and to store a cell library comprising a plurality of component cells, wherein the component cells include transmission gate logic cells and sourcing cells that drive the transmission gate logic cells, wherein each transmission gate logic cell has an associated timing model with a timing characteristic defined as a function of a driving strength attribute of a sourcing cell used to characterize the transmission gate logic cell; and
a processor system coupled to the memory, wherein the processor system is operative to execute the stored program instructions to perform a method for designing an integrated circuit, the method comprising:
generating a net list of an integrated circuit design, wherein the net list comprises one or more component cells selected from a cell library, wherein the component cells include transmission gate logic cells and sourcing cells that drive the transmission gate logic cells, wherein each transmission gate logic cell has an associated timing model with a timing characteristic defined as a function of a driving strength attribute of a sourcing cell used to characterize the transmission gate logic cell; and
auditing the net list to determine if a given sourcing cell in the integrated circuit design has a sufficient driving strength based at least on the driving strength attribute of a transmission gate logic cell being driven by the given sourcing cell.

10. The computing system of claim 9, wherein the auditing step comprises:
identifying, from the net list, a sourcing cell associated with each transmission gate logic cell in the integrated circuit design, and a number of transmission gate logic cells driven by each identified sourcing cell; and
for each sourcing cell in the integrated circuit design, determining if the sourcing cell has a sufficient driving strength, wherein said determining is based at least on the driving strength attribute associated with each transmission gate logic cell being driven by the sourcing cell and a number of transmission gate logic cells being driven by the sourcing cell.

11. The computing system of claim 9, wherein if a given sourcing cell is determined to have an insufficient driving strength, the processor system is further operative to execute program instructions for automatically selecting another sourcing cell having a driving strength that is greater than a driving strength of the given sourcing cell.

12. The computing system of claim 9, wherein the timing characteristic includes a delay from an input port to an output port of the transmission gate logic cell.

13. The computing system of claim 12, wherein the input port comprises a select port of a combinatorial transmission gate logic cell.

14. The computing system of claim 12, wherein the input port comprises a data input port of a transmission gate-based flip-flop cell.

15. The computing system of claim 9, wherein the auditing step is implemented by executing a script which is part of a static timing process of an integrated circuit design tool.

16. A method for building a component cell library for an integrated circuit design tool, the method comprising:
building a transmission gate logic cell having a sourcing cell connected to an input port of the transmission gate logic cell;
generating a timing model associated with the transmission gate logic cell, wherein the timing model defines a delay from the input port to an output port of the transmission gate logic cell as a function of a driving strength of the sourcing cell; and
including the transmission gate logic cell and the associated timing model within a component cell library for use with an integrated circuit design tool, wherein the steps of building, generating and including are steps that are performed by a computer.

17. The method of claim 16, wherein the defined delay represents a delay from a select port to a data output port of a combinatorial transmission gate logic cell.

18. The method of claim 16, wherein the defined delay represents a delay from a data input port to a data output port of a transmission gate-based flip-flop cell.

19. The method of claim 16, further comprising optimizing one of a structure of the transmission gate logic cell and the driving strength of the sourcing cell or both, to minimize state and load variances, prior to generating the timing model.

20. A non-transitory computer readable storage medium comprising a program of instructions which, when executed by a computer, perform the method steps of claim 16.

* * * * *

UNITED STATES PATENT AND TRADEMARK OFFICE
CERTIFICATE OF CORRECTION

| | | |
|---|---|---|
| PATENT NO. | : 8,745,558 B1 | Page 1 of 1 |
| APPLICATION NO. | : 13/755869 | |
| DATED | : June 3, 2014 | |
| INVENTOR(S) | : Joseph Garofalo et al. | |

It is certified that error appears in the above-identified patent and that said Letters Patent is hereby corrected as shown below:

On the Title page:

Item 54 in the title, before "DEPLOYMENT" please insert --DESIGN AND--

In the Specification:

Column 3, line 14, please change "DO" to --D0--

Column 6, line 30, after "PEARL" please insert --.--

Column 8, line 25, please change "an" to --and--

Column 8, line 66, please change "DO" to --D0--

Column 9, line 5, please change "DO" to --D0--

Column 9, line 9, after "port" please change "DO" to --D0--

Column 10, line 30, before "minimize" please delete "obtain"

Signed and Sealed this
Ninth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,745,558 B1  
APPLICATION NO. : 13/755869  
DATED : June 3, 2014  
INVENTOR(S) : Joseph Garofalo et al.

Page 1 of 1

It is certified that error appears in the above-identified patent and that said Letters Patent is hereby corrected as shown below:

On the Title page, Item 54 and in the Specification, Column 1, line 1:

In the title, before "DEPLOYMENT" please insert --DESIGN AND--

In the Specification:

Column 3, line 14, please change "DO" to --D0--

Column 6, line 30, after "PEARL" please insert --.--

Column 8, line 25, please change "an" to --and--

Column 8, line 66, please change "DO" to --D0--

Column 9, line 5, please change "DO" to --D0--

Column 9, line 9, after "port" please change "DO" to --D0--

Column 10, line 30, before "minimize" please delete "obtain"

This certificate supersedes the Certificate of Correction issued September 9, 2014.

Signed and Sealed this  
Seventh Day of October, 2014

Michelle K. Lee  
*Deputy Director of the United States Patent and Trademark Office*